United States Patent [19]

Shapiro

[11] 4,298,936

[45] Nov. 3, 1981

[54] ARRAY PROCESSOR

[75] Inventor: Gerald N. Shapiro, Newton, Mass.

[73] Assignee: Analogic Corporation, Wakefield, Mass.

[21] Appl. No.: 94,428

[22] Filed: Nov. 15, 1979

[51] Int. Cl.³ ............................................. G06F 9/38
[52] U.S. Cl. ................................................. 364/200
[58] Field of Search ......................... 364/200 MS File

[56] References Cited

U.S. PATENT DOCUMENTS

| | | | |
|---|---|---|---|
| 3,875,391 | 4/1975 | Shapiro et al. | 364/200 |
| 3,949,379 | 4/1976 | Ball | 364/200 |
| 4,025,771 | 5/1977 | Lynch, Jr. et al. | 364/200 |
| 4,187,539 | 2/1980 | Eaton | 364/200 |
| 4,225,920 | 9/1980 | Stokes | 364/200 |
| 4,228,487 | 10/1980 | Gupta et al. | 364/200 |

*Primary Examiner*—Raulfe B. Zache
*Attorney, Agent, or Firm*—Weingarten, Schurgin & Gagnebin

[57] ABSTRACT

In an Array Processor, a buffering unit including a FIFO buffer and serial-to-parallel converter, is interposed between a control processor and the remainder of the Array Processing circuitry so as to permit the utilization of a vertical instruction set for generating addresses and function numbers which are then serially coupled from the control processor to the buffering unit.

11 Claims, 8 Drawing Figures

| INSTRUCTION # | NUMBER OF TIMES | FUNCTION | L/I | S₁ | L/I | S₂ | L/I | S₃ | L/I | S₄ | L/I | D₁ | JUMP FIELD |
|---|---|---|---|---|---|---|---|---|---|---|---|---|---|
| 1 | 1 | WGTAD | L | ADR(B₁) | L | ADR(C₁) | L | P₁ | L | Q₁ | L | A₁ | ALWAYS NEXT |
| 2 | N-1 | WGTAD | I | +1 | I | +1 | I | +1 | I | +1 | I | +1 | ALWAYS NEXT |

ADDRESS COMPUTATIONS

*FIG. 5*

```
              COUNT = 1                              COUNT = N-1
LOOP 1:   FUNCTION = WGTAD         LOOP 2:    FUNCTION = WGTAD
              S₁ = ADR(B₁)                         S₁ = S₁ + 1
              S₂ = ADR(C₁)                         S₂ = S₂ + 1
              S₃ = ADR(P₁)                         S₃ = S₃ + 1
              S₄ = ADR(Q₁)                         S₄ = S₄ + 1
              D₁ = ADR(A₁)                         D₁ = D₁ + 1
              DBNZ COUNT, LOOP 1                   DBNZ COUNT, LOOP 2
```

*FIG. 6*

$$\text{WGTADC} \begin{cases} D_{IR} = S_{IR} * S_{3R} + S_{2R} * S_{4R} \\ D_{II} = S_{II} * S_{3I} + S_{2I} * S_{4R} \end{cases}$$

$$\equiv \vec{A}_i = \vec{B}_i * W_i + \vec{B}_{N+i} * W_{N+1-i} \quad 1 \leq i \leq N$$

$$\vec{B}_1 \to \vec{B}_N \quad \vec{B}_{N+1} \to \vec{B}_{2N}$$

| INSTRUCTION # | NUMBER OF TIMES | FUNCTION | L/I | S₁ | L/I | S₂ | L/I | S₃ | L/I | S₄ | L/I | D₁ | JUMP FIELD |
|---|---|---|---|---|---|---|---|---|---|---|---|---|---|
| 1 | 1 | NONE | L | ADR(B₁) | L | ADR(B₁) | L | ADR(W₁) | L | ADR(W₁) | L | ADR(A₁) | ALWAYS NEXT |
| 2 | 1 | NONE | I | 0 | I | +N | I | 0 | I | N | I | 0 | ALWAYS NEXT |
| 3 | 1 | WGTADC | I | 0 | I | +N | I | 0 | I | 0 | I | 0 | ALWAYS NEXT |
| 4 | N-1 | WGTADC | I | +2 | I | +2 | I | +1 | I | -1 | I | +2 | ALWAYS NEXT |

*FIG. 7*

| VERTICAL INSTRUCTION # | VERTICAL INSTRUCTION | CLARIFYING COMMENTS |
|---|---|---|
| 1 | COUNT = N | INITIALIZE WITH PARAMETER |
| 2 | $S_1$ = ADR $\{B_1\}$ | OF ROUTINE, NAMELY: |
| 3 | $S_3$ = ADR $\{W_1\}$ | N AND ADR of $B_1$, $W_1$ and $A_1$ |
| 4 | $D_1$ = ADR $\{A_1\}$ | |
| 5 | $S_1$ = $S_1$ - 2 | SETUP FIRST TIME |
| 6 | $S_3$ = $S_3$ - 1 | USE OF $S_1$, $S_1$, $D_1$ |
| 7 | $D_1$ = $D_1$ - 2 | TO BE LIKE REST OF TIMES |
| 8 | $S_2$ = SHIFT UP (COUNT) | MAKE $S_2$ = 2 *N |
| 9 | $S_2$ = $S_2$ + $S_1$ | NOW $S_2$ = ADR $\{B_1\}$ + $2_N$ - 2 |
| 10 | $S_4$ = COUNT + 1 | MAKE $S_4$ = N + 1 |
| 11 | $S_4$ = $S_4$ + $S_3$ | NOW $S_4$ = ADR $\{W_1\}$ + N + 1 |
| 12 | LOOP I: FUNCT = WGTADC | PIPELINED ARITHMETIC INSTRUCTION |
| 13 | $S_1$ = $S_1$ + 2 | WITH ADDRESS POINTER |
| 14 | $S_2$ = $S_2$ + 2 | INCREMENTING OF $S_1$, $S_2$, |
| 15 | $S_3$ = $S_3$ + 1 | $S_3$, $S_4$, AND $D_1$ |
| 16 | $S_4$ = $S_4$ - 1 | |
| 17 | $D_1$ = $D_1$ + 2 | |
| 18 | DBNZ COUNT, LOOP I | ITERATE BACK TO LOOP I UNTIL NO. OF WGTADC's DONE TOTALS N. |
| 19 | | THEN CONTINUE |

FIG. 8

ARRAY PROCESSOR

FIELD OF THE INVENTION

This invention relates to pipelined digital processing systems, and more particularly to an Array Processor which is easily programmed such that both the control processor and the pipeline processor therewithin, operate at close to 100% efficiency.

BACKGROUND OF THE INVENTION

The term Array Processor as utilized herein refers to special purpose computers designed to perform large volume arithmetic computations, called "number crunching", on an array of data. In general they operate as a front end to a host mini-computer or main frame, and perform number crunching applications more efficiently than could their general purpose hosts.

This efficiency of operation is attained through a different architecture. The heart of an Array Processor's architecture is the pipelined processor, which can operate on more than one set of data at a time. Thus, in vector complex multiplication, which is accomplished through a series of additions and multiplications, one part of the pipeline can be multiplying two numbers, while another part can be adding two different numbers.

Applications for Array Processors run the gamut from non-destructive testing, in which arrays of ultrasonic detectors listen for the sound of bearing failure at a multitude of points around a rotating machine, to computer assisted tomography in which radiation sensors detect x-rays which have passed through the body. Additionally Array Processors are extremely useful in Fast Fourier Transform processing in which the amount of computation necessary to obtain a transformed set of data is very large.

As illustrated in U.S. Pat. No. 3,875,391 issued Apr. 1, 1975 to Gerald Shapiro et al, a pipeline signal processor is described in which the arithmetic unit of the processor processes data in parallel and in which the arithmetic processor is under the control of a unit which is made to track the parallel processing such that the flow of command signals is time coincident with the processing through the arithmetic unit.

In order to control this Array Processor, a long horizontal instruction set is utilized. A horizontal instruction is an instruction specifying a set of simultaneously-occurring or parallel computations associated with that instructions's execution through the use of a large number of independent control fields read out at one time upon execution of the horizontal instruction.

These fields include, but are not limited to such tasks as specifying: the number of times an instruction is to be repeated; the address of the start of the alternative instruction path when conditional instruction branching may occur; the function(s) that the pipeline arithmetic unit is to perform during the current horizontal instruction time interval; the computation(s) that determine the source(s) of data for the arithmetic pipeline, usually an initialization or an incrementation; and, the computation(s) that determine the destination(s) of data from the arithmetic pipeline.

The objective of having a number of control fields is that a separate, independent logic element can be dedicated to each control field, which logic element does the computations required for the corresponding field. Hence, there is a requirement that the actions of each field in an instruction be independent of the actions of the remaining fields in that same instruction.

Each horizontal instruction is related to another horizontal instruction, and each horizontal instruction field is related to the other horizontal fields, such that when the horizontal instructions are executed, the arithmetic unit and the memory are utilized at close to 100% efficiency. Because of the inter-relation of the horizontal instructions, and their fields, the horizontal instruction set guarantees that the processing accomplished in the arithmetic unit is coordinated with the retrieval and inputting of information to and from the memory. In theory, instruction sequences can be written such that the amount of wasted pipeline computations are no more than 20% of total operating time. However, to write such instruction sequences requires special training and skill due to the requirement for a different, unusual instruction type. Moreover, in order to perform many algorithms a horizontal instruction may have many unused fields.

While normal horizontal instruction sets are difficult to write, the problem becomes even more severe if more efficient use of program memory is required. In horizontal instruction sets, the longest instructions are the pipeline instructions which require a large number of fields (bits). However, for so-called "bookkeeping" instructions, only a few fields (bits) are necessary. In horizontal instruction sets, the instructions are of fixed length. Thus, when writing bookkeeping instructions, there are large numbers of wasted or unused bits.

Heretofore, "coding" has been utilized to reduce the length of the horizontal instruction and thus reduce waste. In order to reduce the length of a horizontal instruction, it has been the practice in the past to attempt to code a full pipeline instruction so as to express the instruction in a reduced number of bits. While this can be done in many cases, the complexity of programming in this manner, with a reduced number of bits, puts a premium on the ingenuity of the programmer. Not only must the programmer be able to write the appropriate instruction in fewer numbers of bits, he also must keep track of the inter-relation between one instruction and another.

Another problem with horizontal instructions is the number of things to be specified and the number of things which must occur simultaneously. Coding has been used in an attempt to reduce the number of things to be specified. While this also results in reduced numbers of bits, the coding puts a further premium on the programmer's skills.

It should be noted as part of the prior art that horizontal instructions of a modified nature were used in a prior Array Processor sponsored by Wright Patterson Air Force Base. In 1977, in a report under contract F33615-76-C-1339, with the Wright-Patterson Air Force Base, while partial buffering was used in an Array Processor to buffer the commands to the arithmetic unit, horizontal instruction sets were in fact necessitated because address computation was accomplished downstream of the buffer. Thus, in the prior work for Wright-Patterson Air Force Base, no vertical instruction sets could be used since each command or instruction had a significant portion of its field dedicated to other control functions, most especially downstream address computation. It should be noted that in this early work the instructions were inter-dependent. As will become apparent, a vertical instruction set, on the other hand, refers to instructions that can be written independent of other instructions.

SUMMARY OF THE INVENTION

In the subject system a full buffering unit is interposed between a control processor and the remainder of the Array Processor circuitry so as to permit the utilization of a serially-loaded vertical instruction set. The result is the generation of commands and data read out in parallel to the pipelined arithmetic unit and elsewhere.

In one embodiment, full buffering is provided by a first-in, first-out (FIFO) buffer followed by a serial-to-parallel converter, such that all pipeline addresses and controller bookkeeping instructions are generated in the control processor by a "vertical" instruction set in which the instructions are mutually independent.

A vertical instruction set for the present purposes is a set of instructions, the objective of each being to specify the parameters of only one computation objective.

Examples of computation objectives include: initializing a data pointer, incrementing a data pointer, and decrement-test-and-conditionally branch on an index. A vertical instruction set thus differs from a horizontal instruction set in that the vertical instruction set specifies a series of small computation steps one at a time whose totality then is presented in parallel. The convenience of achieving a usable parallel output by an actual sequential process is significant in both minimizing wasted fields, allowing more alternatives for coding efficiently and also results in a more understandable code.

More specifically, the addresses generated by sequencing of the vertical instruction set are coupled to the buffering unit where appropriate ordering and timing is accomplished. In one embodiment, the buffering unit includes the aforementioned FIFO buffer which accepts serially arranged data at one rate and outputs this data at a fixed rate which may be slower. This serially arranged data is then converted to a parallel format so as to approximate the fields of a horizontal instruction. The resultant outputs of the buffering unit are read addresses, write addresses and pipeline instructions in proper sequence to be used. This differs from the order in which they were generated because the vertical instructions are generated in the logical sequence necessitated by the mathematical functions or algorthm which is to be implemented by the Array Processor.

The loading of the buffering unit, in one embodiment, is accomplished at a speed which may be as much as three or four times that of the speed at which the pipelined arithmetic unit is clocked. Thus, while a fixed timing cycle is utilized to perserve 100% arithmetic and memory utilization, sequential instructions may be added to the buffer at some asynchronous and preferably higher rate so that the operation of the pipeline portion of the unit does not have to wait for any address generation.

It will be appreciated that the buffering unit defines the order of execution of each arithmetic pipeline macrocommand as well as each data source address and each data destination address. Address generation is accomplished in the control processor as opposed to generation after buffering as in the Wright-Patterson work.

Thus, in an Array Processor, a buffering unit is interposed between a control processor and the remainder of the Array Processor circuitry, so as to permit the utilization of a vertical instruction set. This technique eliminates the need for generating addresses by computations after buffering and eliminates the unused fields which are associated with horizontal instructions. This technique also eliminates the problem of writing efficient instructions and instruction sequences to assure close to 100% utilization of the pipeline and associated memory. Thus, vertical instructions reduce the amount of sophisticated programming which would be necessary for full utilization of horizontal fields. This is because the number of fields used may be varied, depending on whether bookkeeping or pipeline tasks are required. Moreover, these instruction types are of the same general type found in modern mini-computers. This saves training costs and facilitates broad application by those trained in existing systems.

Note that as far as conventional programming is concerned, people have been taught mathematics from the view point of breaking a problem apart into a number of simple of steps which makes it easy to conceptualize the solution to a problem. When people have tried to work with parallel processing, which involves overlapping steps, they have had to go back and re-think their whole mathematical approach which was based on doing one step at a time.

When using vertical instructions, it is not necessary to retrain a programmer but rather the programmer is only required to think as he has already been trained, e.g. in the scientific method of breaking a problem apart into little pieces. He is not required, after breaking apart the problem into little pieces, to build back up into bigger pieces before implementation.

Moreover, vertical programming enables use of the concept called structured programming, which is a method of going from a big problem, breaking it down into little pieces and again breaking it down to smaller pieces. As will be appreciated, horizontal instructions processing prevents the use of this approach.

To summarize, in general, it is highly desirable to program vertically and utilize a control unit which outputs addresses, in a serial fashion, one each corresponding to a vertical instruction.

It is likewise extremely desirable to be able to do pipelined arithmetic computations as efficiently as possible, e.g. in a parallel processing unit.

The subject Array Processor permits the two units be used together by the use of a first-in, first-out buffer in combination with a serial-to-parallel conversion unit.

The insertion of such a combination between the control unit and pipelined unit is unusual in that one can now simulate the complicated horizontal instruction set through merely processing the vertical instruction set with a FIFO buffer and a serial-to-parallel converter. The realization that this can be accomplished simply in the manner described is not trivial because of the speed differences involved and because one instruction in the controller does not correspond to one instruction in the pipeline.

What is therefore provided by full buffering and a vertical instruction set is the 100% utilization of all instruction fields coupled with an ease of programming not heretofore possible in Array Processors.

BRIEF DESCRIPTION OF THE DRAWINGS

These and other features of the present invention are more fully set forth below in the detailed description of the preferred embodiment presented below for the purposes of illustration, and not by way of limitation, in the accompanying drawing of which:

FIG. 5 is a chart illustrating the horizontal instructions required for doing the computation illustrated in FIG. 4;

FIG. 6 is a chart illustrating the vertical instructions that are utilized for performing the function illustrated in FIG. 4;

FIG. 7 is a chart illustrating the horizontal instructions utilized for doing the indicated weighted add computation for both real and imaginary numbers; and, FIG. 8 is a chart of the vertical instructions utilized for the complex weighted add illustrated at the top of FIG. 7.

DETAILED DESCRIPTION

Figure 1:
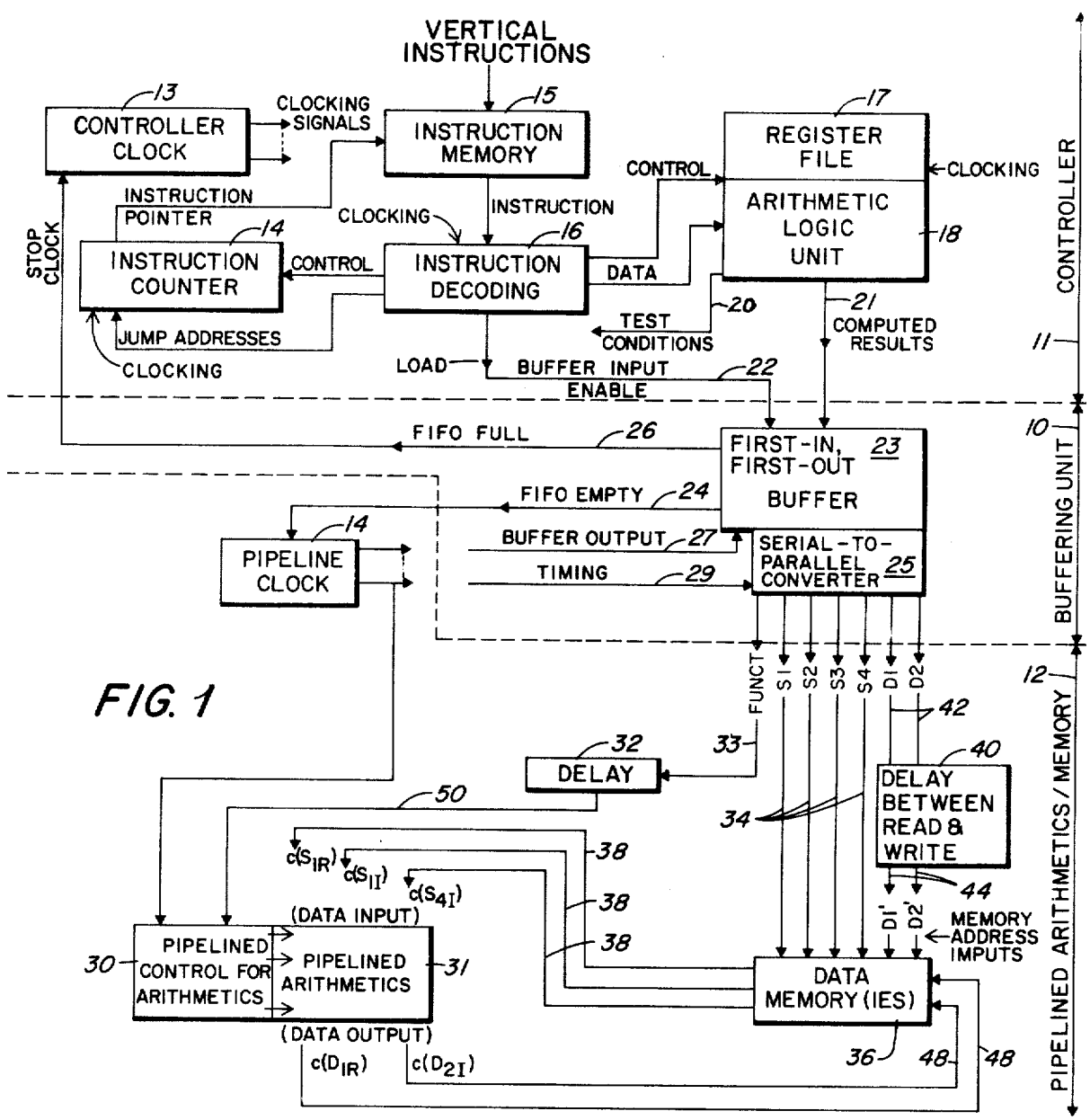
FIG. 1 is a block diagram of the subject Array Processor illustrating controller, buffering and pipelined arithmetic/memory sections.

Referring now to FIG. 1, a block diagram of an Array Processor is illustrated in which a buffering unit 10 is interposed between a controller and a pipelined arithmetic/memory section 12.

As such, the system is divided into three parts; the controller which executes the vertical instructions; the buffering unit which stores the result of those executions and delays them until needed by the third part, the pipelined arithmetics and data memory.

As mentioned hereinbefore, clocking of the system may be accomplished by having two different clocks, e.g. a controller clock 13 and a pipeline clock 14. Data is clocked into the buffering unit by the controller clock, whereas data is clocked out of the buffering unit and is used for memory, address and pipeline commands by the pipeline clock. These two clocks may be synchronized for implementation convenience, but synchronization in general is not necessary.

Controller II operates in the manner of a conventional mini-computer. In one embodiment, an instruction counter 14, also known as a program memory address unit, points to the current instruction being processed, situated in instruction memory 15. That instruction is read out of instruction memory 15 and is decoded by an instruction decoding unit 16 to control a register collection or file 17/arithmetic logic unit 18 combination such as typified by Advanced Micro-Devices Microprocessor AMD2901. This combination is called the RALU.

The decoded instruction is also determined in conjunction with computed test conditions available on line 20 emerging from the RALU. Decoder 16 is coupled to counter 14 so as to instruct the counter as to the next contents of the instruction counter corresponding to the instruction which is to be extended next.

The key difference between the subject and standard mini-computers is that in the subject controller the results of the current computations in the RALU are passed down as inputs to the buffering unit when the instruction code indicates that a sequence of vertical instructions is to be used to control the pipeline. This is accomplished by providing a buffer input enable signal over line 22. This signal is in essence a LOAD command. Thus what is accomplished is that a vertical instruction set is transformed into a series of addresses or function codes presented as serially generated words to the buffering unit.

Figure 3:
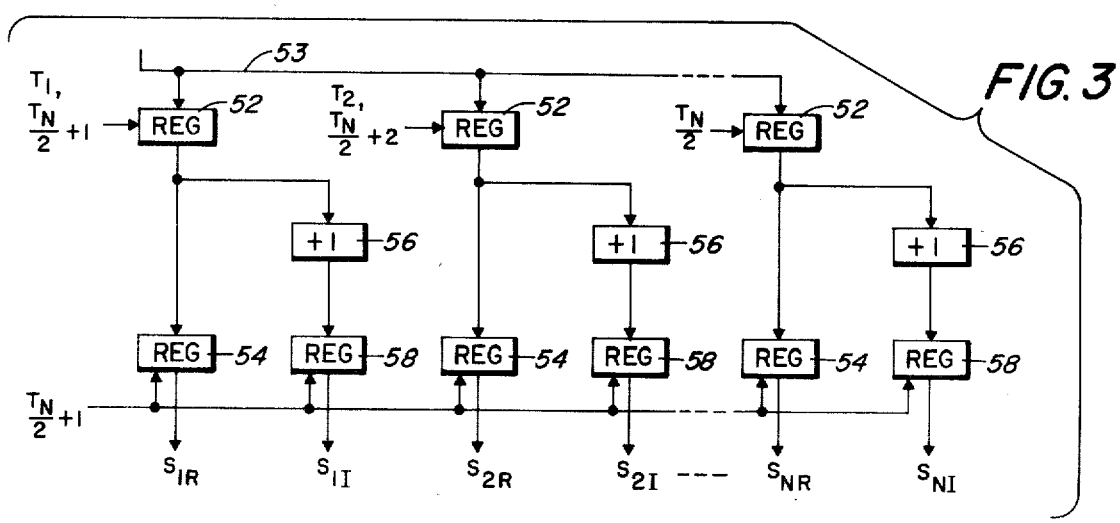
FIG. 3 is a schematic diagram of a serial-to-parallel converter useful in real/imaginary number computations.
Figure 2:
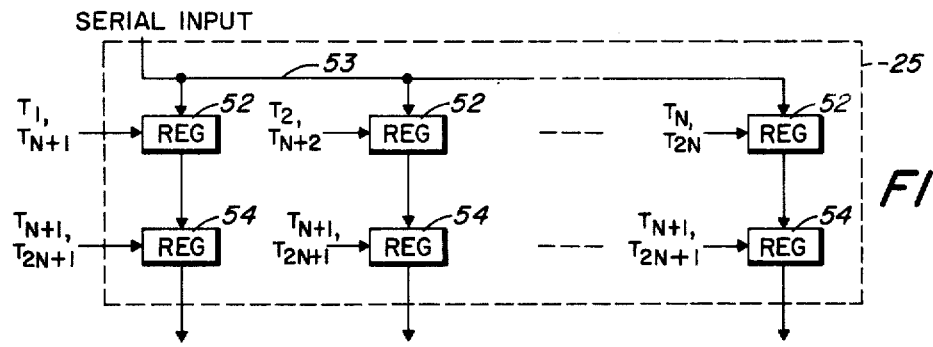
FIG. 2 is a schematic diagram of one type of serial-to-parallel converter.

As mentioned hereinbefore, the buffering unit includes an FIFO buffer 23 and a serial-to-parallel converter 25, the operation of which is detailed in FIGS. 2 and 3.

Buffering unit 10 takes data one word at a time from controller 11 upon indication that it should do so from the controller, at a rate determined by the controller clock. This indication is in the form of the enable signal over line 22 decoded from the instruction. The buffering unit outputs data in parallel words at a steady rate, that rate being determined by pipeline clocking 14. The number of parallel words depends on the number of fields utilized, which in turn depends on the particular configuration of the pipeline arithmetic unit implemented, and not on the function being processed at any given time. Thus there is at least one word defining what function is to be computed in the pipeline arithmetics, two or more data memory read address pointers, such as $S_1, S_2, S_3 \ldots$, and one or more data memory write address pointers, such as $D_1, D_2$, etc. The address pointer nomenclature will be better understood in connection with the algorithms presented in FIG. 4 et sequi.

Depending on the type of memory, there may be a local incrementation done, to provide separate pointers to the real and imaginary parts of a complex number, or the most significant and least significant parts of a double length number. That is, the buffering unit output may be $S_1, S_1+1, S_2, S_2+1$, etc.

Buffer empty and buffer full flags, 24 and 26 respectively are provided to allow appropriate clocks inhibits. Namely, when the buffer backlog equals the maximum capacity of the buffer, the controller's clock must be shut off, to keep from generating more inputs also when the buffer is empty, the pipeline's clock must be shut off to wait for more pipeline arithmetic instructions to execute in the controller.

The nature of the FIFO buffer is that the system does not have to have at all times an exact ratio between pipeline instructions and other (non-pipeline) instructions. The criteria for keeping the arithmetic pipeline/data memory fully occupied is simply that at the average rate at which pipeline instruction sets are generated by the controller is greater than the fixed rate at which the pipeline executes these instructions. Note that the controller's instruction execution time is a different quantity than the pipeline's instruction execution time, since the former involves a simple register-register manipulation, like $S_1 = S_1+2$, while the latter involves operations like multiplying two complex numbers and adding a third complex number.

It will be appreciated that a buffer output timing signal is applied to the FIFO buffer on line 27 whereas timing from pipeline clock 14 is applied on line 29 to the serial-to-parallel converter. It will also be appreciated that the computed results from the arithmetic logic unit 18 are applied to the FIFO buffer over a line 21 as illustrated. Data and control signals to and from the various blocks in the controller are as illustrated by the nomenclature surrounding the particular line involved.

As to the pipelined arithmetic/data memory portion of the subject system, the pipeline arithmetic unit includes a control decoding unit 30 which is a pipeline control for an arithmetic unit 31. This arrangement simplifies system operation. The arithmetic unit requires the specification of sources of data to the pipeline, the destinations of data emerging from the pipeline after the corresponding pipeline delay, and the functions to be performed on that data while it is in the arithmetic pipeline. The pipeline control for the arithmetics is coupled as illustrated to pipeline arithmetic unit 31.

Although it is common to look at source, function and destination as being specified simultaneously, there is a delay between the time of presentation to the pipeline arithmetic unit and their use by this unit. That delay is obtained by the interposition of a delay line 32 which provides appropriately delayed function numbers to the pipeline control portion of the arithmetic unit. Thus function specification is delayed by the amount necessary for the source pointers on lines 34 to fetch data from data memory 36 and supply the fetched information to the arithmetic unit over lines 38. Also, a delay unit 40 is interposed between the serial-to-parallel converter and data memory 36. This delays the destination address pointers provided over lines 42 to allow time for the function and data to pass through the pipeline.

Data memory 36 is shown as having all required addresses 34 and 44 fed to it in parallel and all required data simultaneously read from and written to it over lines 38 and 48. Thus the data inputs are the computed addresses $C(S_{1R})$; $C(S_{1I})$ . . . $C(S_{4I})$. The data outputs are the computed data outputs $C(D_{1R})$ . . . $C(D_{2I})$.

Implementation of such a parallel operating memory may be either by having multiple units of memory, or by time sharing one fast memory unit. The latter permits the use of some word-parallel to word-serial and vice versa conversion mechanisms inside unit 36. An actual implementation may then find it logical to attempt to merge the output of the buffering unit with the serial-to-parallel input of the data memory, to reduce as much of the serial-to-parallel-to-serial process occuring.

The pipeline arithmetic section is shown as a parallel operation, in which input data 38, function requested entering on line 50 and older results 48 are emerging simultaneously.

Referring now to FIG. 2, a schematic diagram of a serial-to-parallel converter utilizable in the subject system, is illustrated in which the serial-to-parallel converter 25 may include a number of registers 52 connected to an input bus 53 carrying a serial input word. Registers 52 are actuated in accordance with the time slot indicated by the nomenclature $T_1, T_2 \ldots T_N$, illustrated to the left of each register, e.g. each register has available at its output the value at its input at the last time this register was clocked and maintains that output for a time period equal to N time units, in one case, $T_1$ to $T_{N+1}$. Each of these time slots are such that what is carried in a given register corresponds to one of the N sequentially presented words on the input bus.

For one cycle, the outputs of registers 52 are coupled to corresponding registers 54 which are all read out at the $T_{N+1}$ time period, thereby to dump the contents of registers 52 in a sample and holding situation so as to form a parallel output.

In the above example the N outputs of each data set are assumed to be required to be stable for N clock cycles, while each of the N inputs is presented for only one clock cycle.

The output for the serial-to-parallel conversion unit may include such features as address incrementing where some of the outputs required differ by only a simple modification of a corresponding output.

Such is the case when working with complex numbers which are stored with real and imaginary components in adjacent memory locations.

This situation is illustrated in FIG. 3 in which input bus 53 supplies serially inputted words to registers 52. Here only ½ the number of input registers 52 are necessary to obtain N outputs. Thus there are N/2 input registers 52. The output of each input register 52 goes both to a register 54 and a device which increments the count in the register by one, incrementer 56. The output of each incrementer 56 is applied to a register 58 such that in the above example each of N/2 inputs is presented for one clock cycle, while the N outputs are presented stable for N/2 clock cycles.

The result is an address or a word, $S_{1R}$, which is the real component, whereas immediately adjacent to the right is an output $S_{1I}$ which is the imaginary component. As can be seen, the real and imaginary components are available simultaneously where necessary for processing via the pipeline arithmetic unit.

Further reductions in FIFO buffer input rates are possible through the introduction of some additional mapping information associated with the vertical instruction set. In the following examples of a vertical code, the position of the address computation determines that the resulting address pointer was used for $S_1$, $S_2$ or $S_3$ or $S_4$ or $D_1$, etc. To reduce the number of vertical instructions required for cases where fewer address pointers are needed, it is only necessary to add a tag field next to each vertical instruction that is part of a pipeline arithmetic operation to indicate which address pointers it is used for. This results in fewer instructions to be written.

The hardware implementation of the serial-to-parallel conversion may be altered from a fixed to a programmed routing pattern, where the routing pattern is one of the first pieces of information retrieved from the data set emerging from the FIFO buffer to determine how the next remaining pieces of information of that data set are to be interpreted.

Thus, by appropriately programming the serial-to-parallel conversion unit, it is possible to reduce even further the complexity of the vertical instruction set.

In summary, it will be appreciated that the vertical orientation of the instruction combined with the buffering unit allows many variations of implementation to further reduce the number of set-up computations required before the buffering operation.

The buffering unit itself, although conceived of as a first-in, first-out buffer followed by a serial-to-parallel converter, may be made more complex by the combining with the buffering function of some of the time-multiplexing likely to occur with the data memory and the arithmetic pipeline. Namely, data is not pulled simultaneously and retrieved from a number of locations in data memory, unless there are a number of data memories.

EXAMPLE ONE

In order to illustrate the difference in processing between utilizing vertical instruction sets and horizontal sets, one can consider the problem of doing a weighted add of two vectors. For simplicity, real and not complex number computations are considered.

Figure 4:
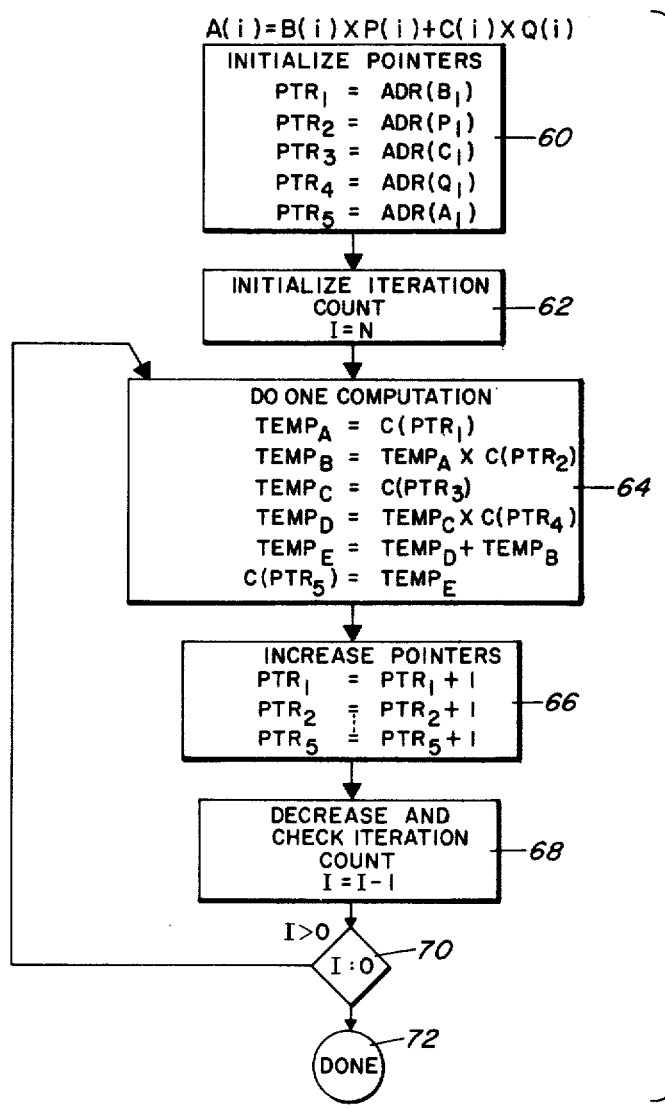
FIG. 4 is an assembly language algorithm for performing a simple weighted add type computation.

Referring now to FIG. 4, to compute the equation:

$A(i) = B(i) \times P(i) + C(i) \times Q(i)$ one can obtain the assembly language program illustrated in FIG. 4. It will be appreciated that this formula corresponds to a "weighted add" computation in which B and C are multiplied respectively by P and Q prior to addition.

In order to do this computation without any kind of parallel processing, one would first initialize all pointers such that pointer $PTR_1$=the address for $B_1$, and so forth. This is illustrated in box 60 such that 5 pointers have associated the addresses of the respective elements $A_1$, $B_1$, $C_1$, $P_1$ and $Q_1$. After generating the pointers, the iteration count is initialized, here for N iterations. The computation is then performed for the first iteration at box 64 in which temporary memories are assigned the contents of given pointers. For instance, $TEMP_A$ is associated with the contents of pointer 1, whereas $TEMP_B$ is associated with $TEMP_A$ x the contents of pointer 2, e.g. $C(PTR_2)$. At the end of the computation, the contents of pointer 5 which is $A_1$ for the first iteration, is now replaced by $TEMP_E$.

After one such computation, the data pointers are increased as illustrated by box 66 and the iteration count decreased, e.g. I=I−1. This is performed at box 68.

Thereafter, the value of I is compared to 0 at 70 and if greater than 0, the computation continues. When I=0, the computations are done as illustrated at 72.

In FIG. 5, with a horizontal instruction set, the code is as illustrated. Note there are two instructions. The first initializes the process and the second iterates for N−1 times. In the FIG. 5 instruction set, WGTAD refers to weighted add and is a function which causes: $D_1=S_1*S_3+S_2*S_4$. WGTAD is an instruction to the pipelined arithmetic unit to perform this calculation. What remains to be done is to provide the arithmetic unit with the data involved. It is not within the scope of this patent to describe how the pipelined arithmetic unit does its calculation, but rather to describe how a vertical instruction set specifying WGTAD is converted into a useable set of parallel instructions. L/I refers to setting the corresponding address pointer to an initial load number setting or to use the quantity in that field as an address increment. Note that the term S refers to sources and D refers to destination. The jump field refers to the next one to execute when the current one is done the proper number of times.

For this simple case, there is an almost directly corresponding vertical instruction set implementation as illustrated in FIG. 6. The first pipeline operation is designated by COUNT=1 and also by the designator LOOP 1. Note that the function is as specified and $S_1$–$S_4$ refers to the addresses of $B_1$, $C_1$, $P_1$, $Q_1$. The destination $D_1$ is the address of $A_1$.

At the end of the set, the term DBNZ refers to a Decrement and Branch on "Not Zero" instruction where the count is decremented and checked to see if it is 0. If it is not 0, the process is repeated by going back to execute the instructions starting at LOOP 1. However, since this is only done one time, the decrement and branch may be omitted. The word COUNT refers to the count field, and LOOP 1 refers to where the process would go should the count field not be zero after decrementing.

Thereafter, the pipeline operation continues with instruction number 9, cf. COUNT=N−1. This is the iterative N−1 pipeline operation for function WGTAD. As can be seen, $S_1$–$S_4$ are incremented by 1 as is $D_1$. After each set of increments, there is a decrement and branch on non-zero count to LOOP 2 step. When the N−1 pipeline operations have been done, operations continue with the 17th instruction (not specified).

In this simple example, it will be seen that the horizontal instruction has no unused fields and is rather simple to write. Moreover, the vertical instruction is likewise easy to write and is rather straightforward.

Note that the parallel processing takes place in the horizontal and vertical instruction sets with the execution of two real multiplications and one real add involved with "WGTAD".

EXAMPLE TWO

Referring now to FIG. 7 a more complicated problem is presented by the processing of a weighted add involving real and imaginary components. The function which is detailed at the top of FIG. 7, illustrates a weighted add in which the function is labeled "weighted add-complex" (WGTADC). Here two complex numbers are to be combined. Note that the subscripts R and I refer to real and imaginary parts of a complex number. The weighting of each of numbers $S_{1R}$, $S_{2R}$, $S_{1I}$, and $S_{2I}$ is accomplished by multiplying them vectorially with a real number. These real numbers are respectively $S_{3R}$ and $S_{4R}$. Note that the two equations $D_{1R}$ and $D_{1I}$ at the top of FIG. 7 can be written as a vector multiplication in which the result is $\vec{A}_i = \vec{B}_i * W_i + \vec{B}_{N+i} * W_{N+i-1}$ for $1 \leq I \leq N$.

Note the weights are used both in the forward and backward direction and the two halves of the complex number B are weighted together to form the complex vector A. What will be immediately apparent from examination of the horizontal instruction code of FIG. 7, is that there are a number of zeros which occur in the $S_1$, $S_3$ and $D_1$ fields. These refer to wasted portions of the horizontal instruction as the equation is evaluated from $B_1$ going to $B_N$ and $B_{N+1}$ going to $B_{2N}$.

It will be appreciated that the horizontal instruction must include the conversion from the pointer $B_1$ to the pointer $B_{N+1}$ and from the pointer $W_1$ to the pointer $W_N$. Four horizontal instructions are needed, in which the first instruction requires no pipeline operation whatsoever. This corresponds to a bookkeeping instruction, namely one whose purpose involves doing part of pointer initialization.

The weighted-add-complex as accomplished by the horizontal instruction set, as is follows:

The first instruction executed is instruction number one, which is done only one time (number of times field). That one time does no arithmetic function (function field), but causes the initial loading of the pointers for $S_1$, $S_2$, $S_3$, $S_4$ and $D_1$ to be set to the addresses of respectively $B_1$, $B_1$, $W_1$, $W_1$ and $A_1$. No branching occurs after the first instruction (jump field) so that the next instruction executed is instruction #2.

Instruction number 2 is executed only once (number of times field). That one time does no arithmetic function (function field), but causes an increment to be added to the pointers for $S_1$, $S_2$, $S_3$, $S_4$ and $D_1$, of respectively O, +N, O, +N, O. After that instruction is completed only the contents $S_2$ and $S_4$ are modified, to be respectively: $ADR(B_N)$ and $ADR(W_{N+1})$. No branching occurs after this second instruction (jump field), so that the next instruction executed is instruction #3.

Instruction number 3 is executed only once (number of times field). That one time causes the pipelined arithmetic section to execute a complex weighted add function (function field) on the data pointed to by the pointers $S_1$, $S_2$, $S_3$, $S_4$ and $D_1$ after the latter have been modified by adding increments of, respectively: O, +N, O, O, O to their value before this instruction was executed. This data for the first "WGTADC" is obtained from $S_1 = ADR(B_1)$; $S_2 = ADR(B_{2N})$; $S_3 = ADR(W_1)$; $S_4 = ADR(W_N)$, and the result gets put into $D_1 = ADR(A_1)$. No branching occurs after this instruction (jump field) so that the next instruction executed is instruction #4.

Instruction number 4 is executed for $N-1$ times (number of time field). Each time that instruction word is executed, increments of, respectively, +2, +2, +1 and −1 are added to the source address pointers $S_1$, $S_2$, $S_3$ & $S_4$ and an increment of +2 is added to the destination address pointers $D_1$. The value of those pointers after incrementation is used for sources and destination address pointers to the Data Memory to be used with a pipelined arithmetic function of weighted-add-complex (function field). After instruction #4 has been executed once, twice and thrice, the final values for pointers $S_1$, $S_2$, $S_3$, $S_4$ and $D_1$ are:

|        | $S_1$ | $S_2$      | $S_3$ | $S_4$       | $D_1$ |
|--------|-------|------------|-------|-------------|-------|
| once   | $B_3$ | $B_{2N+3}$ | $W_2$ | $W_{N-1}$   | $A_3$ |
| twice  | $B_5$ | $B_{2N+5}$ | $W_3$ | $W_{N-2}$   | $A_5$ |
| thrice | $B_7$ | $B_{2N+7}$ | $W_4$ | $N_{N-3}$   | $A_7$ |

Note that the A and the B addresses step by increments of two because the complex data is packed with the imaginary part of that complex data in the next sequential data memory location after the real part of that complex data.

After instruction number 4 has been executed $N-1$ times, control is directed by the jump field to go to instruction #5 (not specified). Note that for this example the horizontal word's jump field is used trivally. In actual applications, particularly with multi-dimension arrays and/or nested program loops, the jump field may have to indicate very complicated program flows. Multi-way branching instructions are also possible, as indicated in U.S. Pat. No. 3,875,391, etc.

The corresponding code with vertical instructions can be much reduced over a simple one-to-one conversion by using the results of one initialization to get a head start on other initializations. For example, one possible equivalent to the instruction set illustrated in FIG. 7 is illustrated in FIG. 8.

In the FIG. 8 vertical instruction set, note that the number of places where the changeable variables are introduced has been minimized to only instructions 1, 2, 3 and 4. Changeable variables include N, the number of elements in each vector, and the addresses $ADR(A_1)$, $ADR(B_1)$ and $ADR(W_1)$.

The weighted add-complex as accomplished by the vertical instruction is as follows:

The weighted add-complex as accomplished by the vertical instruction code given in FIG. 8. There, instructions #1 through #4 initialize the pointers COUNT, $S_1$, $S_3$ and $D_1$ to be respectively: N, (the number of iterations), $ADR(B_1)$, $ADR(W_1)$ and $ADR(A_1)$. Note that pointers $S_2$ and $S_4$ need not be initialized directly with the parameters of the computation but are done later in instructions 8 through 11 with the values first set up in $S_1$, $S_3$ and COUNT pointers. This is a savings over horizontal in terms of the number of places where program variable parameters need be inserted.

Instructions #5, #6 and #7 follow which decrease the pointers $S_1$, $S_3$ and $D_1$ by the appropriate amount so the first pipeline arithmetic computation can be set up within the same code loop that does the next $N-1$ pipeline computations. The advantage of doing all N steps with the same pipeline code loops is clarity compared with having the first pipeline step different from the rest. Instruction #8 shifts up the value for the count pointer and puts that value of 2N into $S_2$ as part of initializing $S_2$. The rest of initializing $S_2$ occurs by instruction #9, leaving ADR $(B_{2N-1})$ for pointer $S_2$ after execution. Similarly, initialization of $S_4$ is done in two instructions, #10 and #11, leaving ADR $(W_{N+1})$ for pointer $S_4$.

Instructions #1-11 initialize the address pointers and iteration count. Having done this, instructions #12 through #17 specify the function to be done (WGTADC) and the addresses of the data involved.

Instruction 18 performs the decrementing and test for zero operation, which causes branching back to instructions #12 through #17 for $N-1$ times before going onto to instruction #19 (not specified). Thus, N pipeline operations are loaded from the controller to the buffer.

Instructions 12 through 17 actually specify the pipelined arithmetic function and the increments to be utilized to form the pointer values used. Thus when instructions 12-17 are executed for the Nth time the values obtained are:

| Time                | $S_1$ | $S_2$      | $S_3$ | $S_4$       | $S_5$ |
|---------------------|-------|------------|-------|-------------|-------|
| after initialization| $B_4$ | $B_{2N-1}$ | $W_0$ | $W_{N+1}$   | $A_1$ |
| After 1st iteration | $B_1$ | $B_{2N+1}$ | $W_1$ | $W_N$       | $A_1$ |
| After 2nd iteration | $B_3$ | $B_{2N+3}$ | $W_2$ | $W_{N-1}$   | $A_3$ |
| After 3rd iteration | $B_5$ | $B_{2N+5}$ | $W_3$ | $W_{N-2}$   | $A_5$ |

The execution of instruction #12 in this example is used to set a flip-flop indicator in the instruction decoding 16 (FIG. 1) to start loading buffer 23 with information from this and the succeeding "q" computations, where "q" here is five. (see line 22 of FIG. 1). This causes the buffer input to be loaded with the pipeline function name after each time instruction 12 is executed. Then five address pointers are loaded into the buffer, one each after instruction 13, 14, 15, 16 & 17 are executed.

The above coding has used the relationship between some of the data pointers, namely $S_2$ and $S_4$, and the remaining data pointers $S_1$, $S_3$ and COUNT. In general, a vertical instruction set allows exploiting relationships without having to initialize each address pointer independently. For some applications, it may even be possible to reduce the number of different address pointers used. For example, if the array $A_1$ is actually the first part of the array $B_1$, then instructions #4 and #7 can be eliminated, and instruction #17 replaced by the code $S_1 = S_1$, thereby saving one register of the control processor.

As can be seen, the vertical instruction is written in the order in which one would ordinarily think to compute the required function, whereas the horizontal instruction set must take into account the inter-dependency of the various instructions in terms of the way in which the machine will actually implement the function described.

Moreover, with the vertical instruction set, there are no portions of the corresponding parallel fields produced by the subject system which are unused, therefore taking up valuable controller time. Moreover, the vertical instruction set can be run faster and asynchronously vis. a vis. the pipeline arithmetic unit.

In Example Two, the final version of the horizontal instruction code, requires one or more long words for a total of 4×7=28 sets of fields. This contrasts with the vertical instruction set's use of only 18 words of comparable computation power.

The above example shows that the need to specify control of all address parameters and counters simultaneously with a horizontal instruction set results in a considerable amount of waste. Waste refers here to many instruction fields that do nothing, but must still exist. Waste also refers to time intervals when no useful pipeline instructions can be executed because the instruction fields are tied up with an operand pointer set-up.

As an additional advantage, note that in a horizontal instruction set, there are fields which are unused whereas in a vertical instruction set one need not insert useless instructions just to satisfy a template. Moreover, by using the FIFO buffer in combination with a serial-to-parallel converter, the address computation within one pipeline instruction need not be independently formed. One can take advantage of the address relationships and eliminate redundances. For example, if a destination address is the same as a source address, it need not be computed twice. This can be done just by reading out at the appropriate time the identical source computation when the destination computation is to be done. Alternatively, if source and destination tags are used, the same computation can be tagged as both source and destination address pointer.

Further benefits accrue with the use of vertical instruction sets when the addressing increments are no longer just one or two, but variable, as in matrix manipulations. Without going into detail, it will be appreciated that address increments can be variables, whose set-up is extremely awkward with a horizontal instruction set, because each variable is in reality initialized independently of all the others. In other words, the horizontal instruction set is trying to force the user to do things in parallel which are normally thought of in a sequential manner. The above examples show that a natural way to set up a task solution is to break computation sequence into initialization steps followed by iteration steps. For iteration, either horizontal or vertical instruction sets may be adequate. But for initialization, a vertically oriented instruction set is used to minimize code and execution time waste and to take advantage of the way that computer programmers are taught e.g. to use sequential instructions.

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. An Array Processor comprising in combination:
a controller having serially generated words as an output therefrom;
a buffering unit including a FIFO buffer and a serial-to-parallel converter coupled thereto:
means for coupling said serially generated words to said buffering unit; and,
a pipelined arithmetic unit and memory coupled to said buffering unit and controlled thereby.

2. An Array Processor comprising in combination:
a controller;
means for inputting a serial instruction set into said controller such that the output of said controller includes serially generated words;
a buffering unit coupled to said controller, said buffering unit including an FIFO buffer and a serial-to-parallel converter coupled thereto for converting the serially generated words into parallel fields; and,
a pipelined arithmetic unit and memory coupled to and controlled by the parallel fields.

3. A method of facilitating the programming of an Array Processor having a controller and a pipelined arithmetic unit/memory section comprising:
interposing a buffering unit between the controller and the pipelined arithmetic unit/memory section for the control of the arithmetic unit/memory section, the buffering unit providing parallel fields corresponding to a serially developed set of words; and,
providing the controller with a vertical instruction set such that the controller generates a corresponding serially developed set of words.

4. The method of claim 3 wherein said parallel fields are outputted at a fixed rate.

5. The method of claim 4 wherein the rate at which the vertical instruction set is processed by the controller is higher than the fixed rate of the parallel output from the buffering unit.

6. A method of eliminating waste in the control of an Array Processor, comprising:
providing the Array Processor with a vertical instruction set and means for converting the vertical instruction set into a set of parallel fields read out to the pipelined arithmetic and memory sections thereof.

7. The method of claim 6 wherein said parallel fields are read out at a fixed rate.

8. The method of claim 7 wherein the rate at which the vertical instruction set is provided is higher than the fixed output rate.

9. An Array Processor comprising in combination:
a controller having serially generated words as an output therefrom;
a buffering unit including means for converting said serially generated words into a parallel format;
means for coupling said serially generated words to said buffering unit; and,
a pipelined arithmetic unit and memory coupled to said buffering unit and controlled by the parallel formatted words from said buffering unit.

10. Apparatus for facilitating the programming of an Array Processor having a controller and a pipelined arithmetic unit/memory section comprising:
a buffering unit interposed between the controller and the pipelined arithmetic unit/memory section for the control of the arithmetic unit/memory section, the buffering unit providing parallel fields corresponding to a serially developed set of words; and,
means for providing the controller with a vertical instruction set such that the controller generates a corresponding serially developed set of words.

11. The apparatus of claim 10 wherein said buffering unit includes means for outputting said parallel fields at a fixed rate.

* * * * *